March 1, 1966 T. C. FURNAS, JR 3,238,371
X-RAY BEAM ATTENUATOR
Filed Feb. 11, 1963 2 Sheets-Sheet 1

INVENTOR.
THOMAS C. FURNAS, JR.
BY Thomas C. Fisher
Watts & Fisher, attys.

March 1, 1966   T. C. FURNAS, JR   3,238,371
X-RAY BEAM ATTENUATOR

Filed Feb. 11, 1963   2 Sheets-Sheet 2

INVENTOR.
THOMAS C. FURNAS, JR.
BY Thomas E. Fisher
Watts & Fisher, attys.

United States Patent Office 3,238,371
Patented Mar. 1, 1966

3,238,371
X-RAY BEAM ATTENUATOR
Thomas C. Furnas, Jr., Cleveland Heights, Ohio, assignor to Picker X-Ray Corporation Waite Manufacturing Division, Inc., Cleveland, Ohio, a corporation of Ohio
Filed Feb. 11, 1963, Ser. No. 257,474
11 Claims. (Cl. 250—105)

This invention relates to X-ray diffraction and more particularly to a structure for delineating a selected beam of X-rays.

With X-ray diffraction studies, it is customary to bombard a specimen under study with a beam of X-rays emanating from an X-ray tube. Rays diffracted by the specimen are measured and recorded by suitable detectors and instrumentation to provide information as to the structure of the specimen.

Customarily, the beam of rays emanating from the X-ray tube are collimated into a thin plane of rays. Thus, all rays emanating from the tube other than those in a thin plane paralleling an axis of the specimen and/or detector rotation, are absorbed by a collimator. Similarly diffracted rays are passed through a suitable structure which absorbs all of the rays other than those in that portion of the diffracted beam which one wishes to study. Usually the structure which is interposed between the specimen and the detector for absorbing excessive diffracted radiation is referred to as a slit. Since both the collimating structure and the slits are used to attenuate a beam of X-radiation, the structure of this invention which is utilized for both purposes will be referred to hereafter as a beam attenuator.

While adjustable collimation is quite common in medical X-ray, heretofore the collimating and slit structures of diffractometers have been fixed. The reason for this has been because of the great preciseness in attenuation of beams which is required for the diffraction science. Such adjustment as has been obtainable has been obtained in a slit where a pair of plates are clamped to the face of the slit housing by a pair of screws and the slit plates are positioned and aligned and then clamped. Because of the tedious time-consuming effort required to align and clamp these plates, it has been customary to simply substitute an entirely different slit structure when an opening of a different size was required rather than undertake the chore of adjusting such a slit.

The present invention provides, for the first time, an adjustable beam attenuating structure for use in diffraction studies. The preferred structure has a body with a through X-ray beam passage and a pair of rotatably adjustable beam attenuating members positioned across the passage. The rotatable members include eccentric portions across the passage so that on rotation of the members, a beam opening of selected but variable width is defined by the eccentric portions. Preferably this width may vary from substantially zero to some predetermined maximum width. Also, preferably friction alone maintains the members in an adjusted position.

In one adaptation of the principles of this invention two pairs of these eccentric rotatable adjustment members are provided with the members of each pair parallel to the members of the other pair and spaced. This adaptation of the principles of the invention is, for example, utilized for an adjustable collimating structure which very precisely and accurately delineates a fine plane-like beam of X-rays paralleling the axis of specimen rotation.

In another adaptation of the invention as a receiving aperture, first and second pairs of rotatable eccentric members are provided, this time with the members of one pair at right angles to the members of the other pair so that a rectangular opening is defined of both variable height and width.

With either of these adaptations, the eccentric members of each pair may be geared together so that rotation of one member causes equal and opposite rotation of the other member and therefore symmetrical adjustment. In the case of the adaptation for a receiving aperture wherein adjustment of all four sides of a rectangle is obtained, in some applications it is desirable to eliminate the gearing in order that selected portions of a diffracted beam of energy may be studied.

Accordingly, the object of this invention is to provide a novel and improved adjustable beam attenuating structure designed for use with a diffractometer or the like.

Other objects and a fuller understanding of the invention may be had by referring to the following description and claims taken in conjunction with the accompanying drawings in which:

Figure 1:
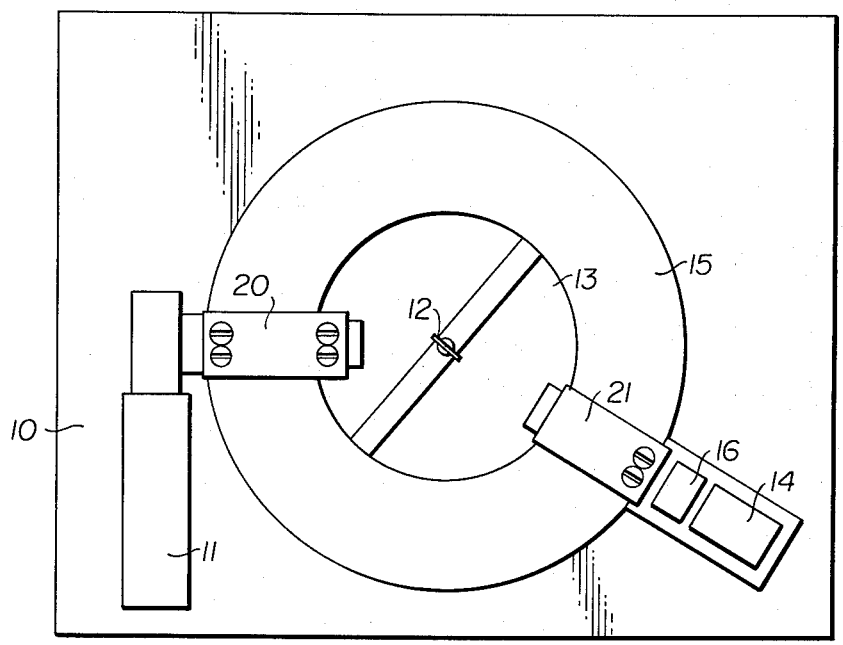
FIGURE 1 is a schematic plan view of a diffractometer incorporating beam delineating structures of this invention.

Referring now to FIG. 1, a schematic plan view of a diffractometer 10 is shown. The diffractometer 10 may be one of the type described and claimed in greater detail in my co-pending application for United States patent, Serial No. 236,468 filed November 2, 1962, as a continuation of Serial No. 12,492, filed February 29, 1960, now abandoned, under the title "Diffractometer." As shown schematically in FIGURE 1, the diffractometer has a housing 10 equipped with an X-ray tube 11. In accordance with the teaching of my co-pending application, the tube 11 is preferably mounted on the housing 10. A specimen 12 is mounted on a rotatable member 13 for rotation about an axis located in a beam of X-rays emitted by the tube 11. A detector 14 is supported on a second rotatable member 15 and positioned to receive, measure, and record energy diffracted by the specimen 12. A slit 16 often will be positioned in front of the detector to serve as a receiving aperture. The beam delineating structures of this invention are shown in the form of a collimating structure at 20 and a receiving aperture at 21.

Figure 2:
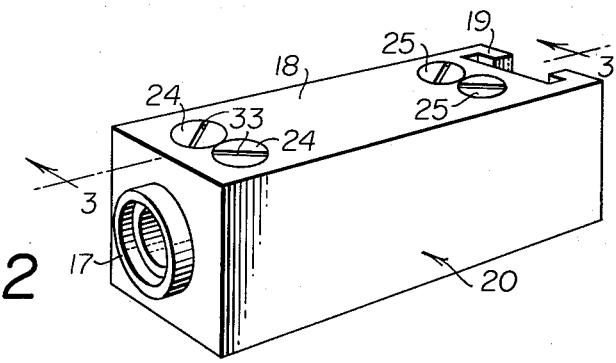
FIGURE 2 is a perspective view of the adaptation of this invention wherein spaced pairs of eccentric adjustable members are provided and the members of one pair are parallel to the members of another pair.
Figure 3:
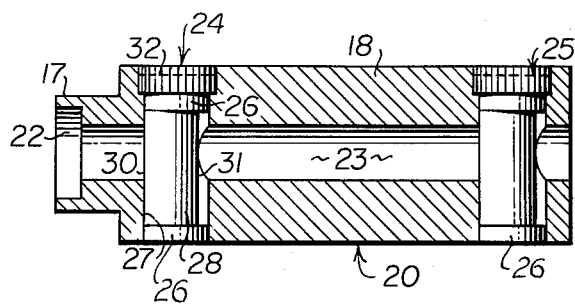
FIGURE 3 is a sectional view of the structure of FIGURE 2 as seen from the plane indicated by line 3—3 of FIGURE 2.

Referring now to FIGURES 2 and 3, the beam attenuating structure 20 shown in use as a collimator in FIGURE 1, is pictured in greater detail. The structure 20 is utilized sometimes as an adjustable receiving slit as well as a collimating structure. In either case, the beam delineating structure 20 has a body 18 equipped with a mounting track 19 at one end and an annular mounting flange 17 at the other end. The flange 17 may be coupled to a diffractometer shutter of the type described in my co-pending application for patent, Serial No. 104,432 entitled Diffractometer Shutter, filed April 20, 1961, now Patent No. 3,113,214.

The mounting flange 17 is counterbored at 22. The counterbore 22 is in axial alignment with a through bore 23 which forms an X-ray beam passage. First and second pairs of eccentric adjustable members are provided at 24 and 25. The eccentric pairs of members 24, 25 are, in this adaptation of the invention, spaced from one another and parallel. The members of each pair are identical, and accordingly one of the members 24 will be described in detail, it being recognized that the other members of these two pairs are identical.

The member 24 includes a spaced pair of concentric journaling portions 2 which fit closely in a carefully formed and located adjustment bore 27. The adjustment bore 27 is formed in the body 18 with the adjustment bore axis normal to but spaced from the axis of the beam passage 23. The spacing of the two axes will be a distance equal to the radius of the adjustment bore 27 so that the bores for the pair of members 24 are substantially in line contact along a line which intersects the axis of the beam passage 23.

The adjustable member 24 includes an eccentric portion 28 extending from one journalling portion 26 to the other. This eccentric portion 28 extends across the beam passage 23 so that the paired eccentric portions attenuate a beam of adjustable width. Along an imaginary common line 30, the eccentric portion 28 is in the contour generated by the spaced and axially aligned journalling portions 26. Along another imaginary line 31, 180° from the common line 30, the spacing of the eccentric portion 28 from this cylindrical contour generated by the journalling portions is its maximum. Accordingly, when the member 24 is rotated 90° in one direction from the position shown in FIGURE 3, the line 30 will substantially intersect the beam passage 23. With this position of adjustment of both of the members 24, the passage 23 will be substantially closed. Rotation 180° from this position and 90° in the opposite direction from the position shown in FIGURE 3 produces a slit of maximum width.

To assure symmetrical adjustment, the members 24 include gear portions 32 near their top. These gear portions 32 are carefully formed pinions which mesh with one another to cause equal and opposite adjustment rotation. Slots 33, FIGURE 2, are formed in the tops of the adjustment members 24 to receive a screwdriver or other suitable adjusting tool.

Figure 8:
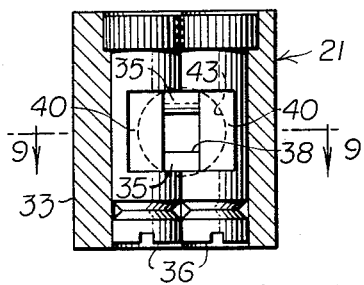
FIGURE 8 is a view corresponding to FIGURE 6 but showing the adaptation of FIGURE 4 equipped with geared adjustment members; and, FIGURE 9 is a sectional view of the device of FIGURE 8 as seen from a plane indicated by the line 9—9 of FIGURE 8.
Figure 9:
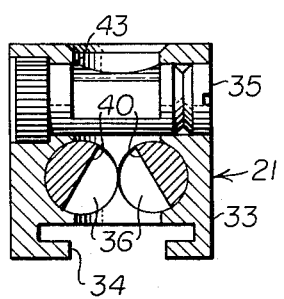

Referring now to FIGURES 4–9, adaptations of the invention wherein the adjustment members of one pair are perpendicular to the adjustment members of the other pair are shown. In FIGURES 8 and 9, the beam attenuating structure 21 is shown with detail. The structure 21 includes a body 33 equipped with body flanges 34. First and second spaced pairs of rotatably adjustable beam attenuating members 35, 36 are provided.

In the adaptations of the invention shown in FIGURES 4–9 the eccentric portion of the members 35, 36 varies somewhat from the members 24, 25 and is the preferred construction. Additionally, the members 35, 36 are mounted so that the members of one pair have their axes positioned normal to the members of the other pair. In other respects the members of the pair 35, 36 are identical to those of the pairs 34, 35.

In the case of the members 35, 36 a notch is cut in the eccentric portion of each member terminating at a flat planar surface 40. This planar surface 40 preferably includes a segment of the axis of the adjustment member so that both the width and the height of the rectangular opening 38 delineated by the members may vary from "0" to a maximum dimension equal substantially to the diameter of one adjustment member.

Figure 4:
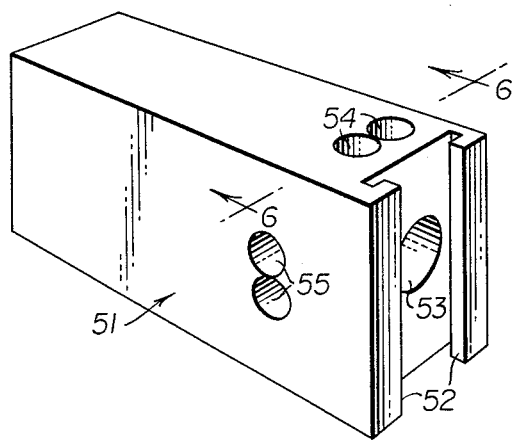
FIGURE 4 is a perspective view of the adaptation of the invention wherein the members of one adjustable pair are perpendicular to the members of the other pair.
Figure 5:
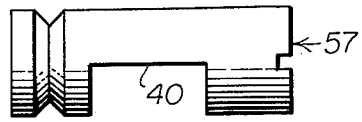
FIGURE 5 is a plan view of an adjustable eccentric member of the type which is free of gearing.

In FIGURE 4 a perspective view of a body 51 is shown. The body 51 differs from the body 33 of FIGURES 8 and 9 in that it is longer. In other respects it is similar, being equipped with mounting flanges 52, and a bore 53 defining a through beam passage corresponding to the bore 23 of FIGURES 2 and 3 and bore 43 of FIGURES 8 and 9. First and second pairs of adjustment member receiving bores 54, 55 are provided. The adjustment bores 54 are normal to the adjustment bores 55 again to provide a structure wherein both the height and the width of a beam opening may be adjusted. When the bores 54, 55 are counterbored to receive gear portions, the body 51 can be used in place of the body 33. When equipped with smooth through bores as shown in FIGURE 4, the body 51 receives adjustment members of the type shown in FIGURES 5–7 as identified by the numeral 57. The adjustment members 57 differ from the members shown in FIGURE 8 and FIGURE 9 in that gearing is eliminated so that independent adjustment of the four members is provided. This independent adjustment of the four members permits selective viewing of portions of a specimen diffracted beam.

Figure 6:
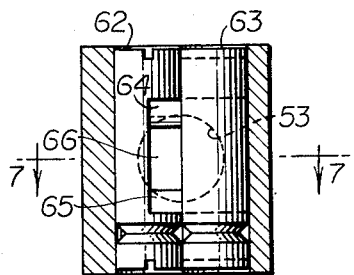
FIGURE 6 is a sectional view of the adaptation of FIGURE 4 as seen from a plane indicated by the line 6—6 of FIGURE 4 and equipped with the non-geared, rotatably adjustable adjustment members of FIGURE 5.
Figure 7:
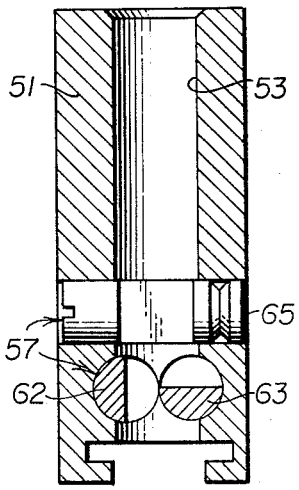
FIGURE 7 is a sectional view of the structure of FIGURE 6 as seen from the plane indicated by the line 7—7 of FIGURE 6.

For clarity of illustration in FIGURES 6 and 7, the members 57 are designated by the numerals 62–65. Referring to FIGURE 6, with the members 62–65 in the positions shown, a rectangular beam passage 66 is delineated which extends from the axis of the through bore 53 to the left a maximum width and is of maximum height from top to bottom with the members 62, 64, 65 all being in their full open position while the member 63 is in a full closed position.

Commencing from the positions shown in FIGURES 6 and 7, the following adjustments will produce the indicated results:

(1) Rotation of the member 63 through 180° to its full open position will produce an attenuating passage of maximum size.

(2) Rotation of the member 64 to a full closed position will close the passage as will rotation of the members 64 and 65.

(3) Rotation of the member 64 to a full closed position will delineate a lower left-hand quadrant of the maximum opening.

(4) Rotation of the lower one of the horizontally disposed members 65 to a full closed position will delineate an upper left-hand quadrant.

(5) Delineation of the right-hand quadrant and/or the right-hand half of the full-opened passage is obtained by rotating the member 63 to its full open position, member 62 to its full closed position and thereafter making appropriate manipulation of the horizontally disposed members 64, 65.

While the invention has been described with detail it is believed that it comprises a beam attenuating structure having a body with a through beam passage and a beam attenuating member adjustably mounted in the body. The member has an eccentric portion extending across a part of the beam passage so that on adjustment of the member a slit of varying transverse dimension will be delineated.

From the preceding discussion it will be seen that for the first time a structure has been provided in which the beam attenuating structures in an X-ray diffractometer are truly adjustable. According to the application they may be either adjustable symmetrically or individually to permit selective examination of portions of the diffracted rays. Further spaced pairs of eccentric adjustable members may be provided with either axis of one pair parallel to the axis of another pair or perpendicular to them according to whether it is desired to attenuate a fine thin plane of rays, substantially a line or rays, or a rectangle.

Although the invention has been described in its preferred form with a certain degree of particularly, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:
1. An X-ray beam attenuator comprising:
 (a) a housing defining a through beam passage;
 (b) said housing having first and second spaced pairs of parallel bores;
 (c) the bores of each pair being substantially tangential to one another;
 (d) each bore including spaced end journalling portions and a central beam portion intersecting said passage;
 (e) first and second pairs of rotatable attenuator members, each member being mounted in a different and associated one of the bores, each member including a central eccentric portion and spaced journalling portions journaled in the journalling portions of its associated bore; and,
 (f) the members of each pair being rotatable from a substantially fully closed position blocking said passage to a fully open position.

2. The device of claim 1 wherein said member eccentric portions are cylindrically contoured.

3. The device of claim 1 wherein each of the eccentric portions is provided by a flat.

4. The device of claim 1 wherein the axes of the members of the first pair are at right angles with the axes of the members of the second pair whereby to define four sides of a variable and closable passage of rectangular cross section.

5. The device of claim 4 wherein the members are independently adjustable.

6. The device of claim 1 wherein the members of each pair are directly geared together such that rotation of one causes equal and opposite rotation of the other.

7. The device of claim 1 wherein the members each include adjustment means adjustable from externally of the housing with the adjustment means of each pair of members being adjacent one another.

8. An X-ray beam attenuator comprising:
 (a) a housing defining a through beam passage;
 (b) said housing having a pair of parallel bores;
 (c) the bores being substantially tangential to one another;
 (d) each bore including spaced end journalling portions and a central beam portion intersecting said passage;
 (e) first and second rotatable attenuator members, each member being mounted in a different and associated one of the bores, each member including a central eccentric portion, and spaced end journalling portions journaled in the journalling portions of its associated bore; and,
 (f) the members being rotatable from a substantially fully closed position blocking said passage to a fully open position.

9. The device of claim 8 wherein the members are independently adjustable.

10. The device of claim 8 wherein the members of each pair are geared together such that rotation of one causes equal and opposite rotation of the other.

11. The device of claim 8 wherein the members each include adjustment means adjustable from externally of the housing with the adjustment means being adjacent one another.

References Cited by the Examiner
UNITED STATES PATENTS

| | | | |
|---|---|---|---|
| 2,814,728 | 11/1957 | Langsdorf | 250—49.5 |
| 2,851,610 | 9/1958 | Akashi et al. | 250—49.5 |
| 2,870,337 | 1/1959 | Neff | 250—51.5 |
| 2,998,525 | 8/1961 | Powell | 250—105 |

RALPH G. NILSON, *Primary Examiner.*

H. S. MILLER, A. L. BIRCH, *Assistant Examiners.*